I. H. BOBO.
Cotton-Chopper.
No. 216,825. Patented June 24, 1879.
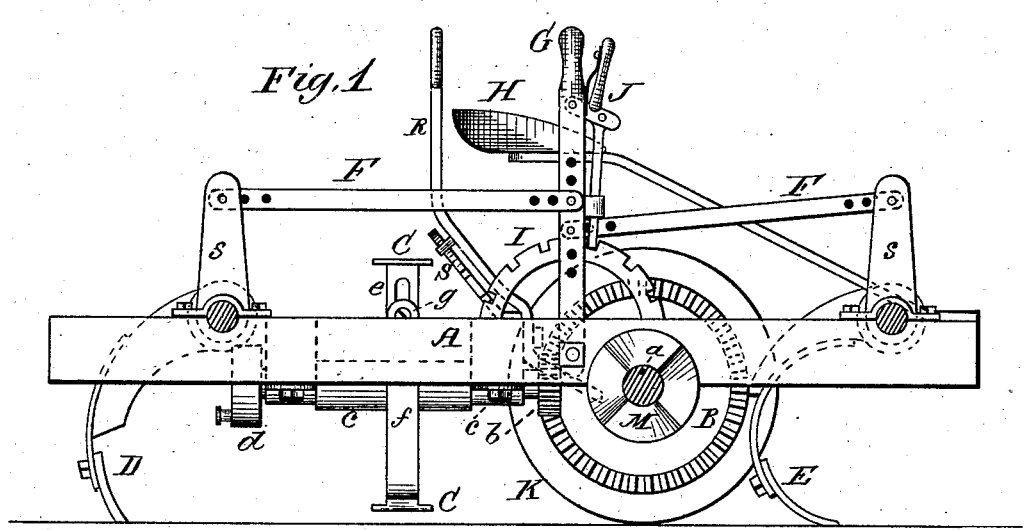
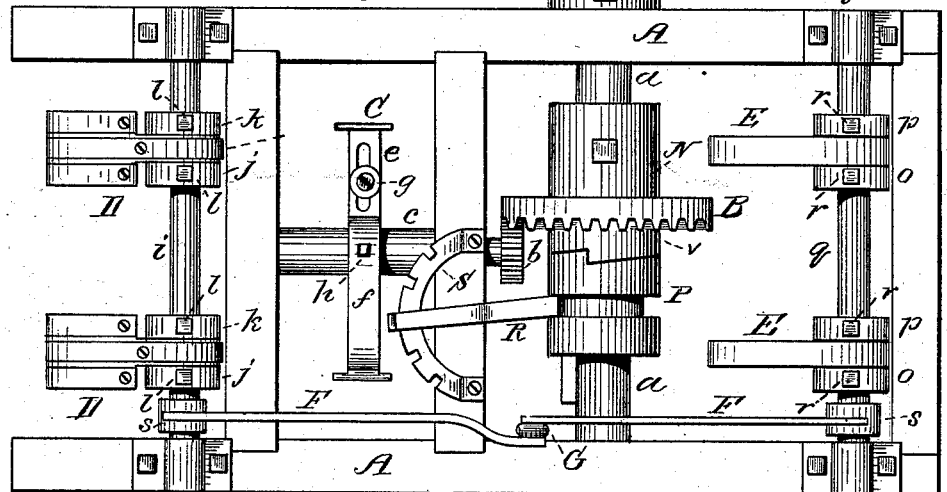
Witnesses
Nat. E. Oliphant
Geo. R. Porter
Inventor
Isaac H. Bobo,
per Chas. H. Fowler
Attorney

UNITED STATES PATENT OFFICE.

ISAAC F. BOBO, OF COUNTY LINE, TENNESSEE.

IMPROVEMENT IN COTTON-CHOPPERS.

Specification forming part of Letters Patent No. 216,825, dated June 24, 1879; application filed April 18, 1879.

*To all whom it may concern:*

Be it known that I, ISAAC FRANKLIN BOBO, of County Line, in the county of Moore and State of Tennessee, have invented a new and valuable Improvement in Cotton-Choppers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation, partly in section; and Fig. 2 is a top-plan view.

This invention has relation to that class of agricultural machines used for the purpose of cultivating or chopping cotton, broom-corn, and sugar-cane.

The invention has for its object to provide such a machine simple in its operating parts, and in which the scrapers and cultivators can be regulated by the driver to gage their depth in the ground, and arranged upon their axles so as to admit of their having a longitudinal and vertical adjustment.

The novelty consists in the construction and arrangement of the several parts, as will be hereinafter described, and subsequently pointed out in the claims.

In the accompanying drawings, A represents the frame of the machine, preferably of rectangular form, and having an axle, a. The axle a has loosely hung thereon a toothed driving-wheel, B, the teeth of which engage with a pinion, b, upon a shaft, c, to which are keyed hoes or cutters C. By the rotation of the driving-wheel B, in connection with the pinion-shaft c, the required rotary motion is imparted to the hoes or cutters. A pitman-wheel, d, is secured to the rear end of the shaft c, for attaching a pitman of a mower when it is desired to use, in connection with the cultivator, a mower. The cutters C are provided with slotted shanks e, attached to the arms f of the shaft c by screw-bolts g, so that by loosening said bolts the cutters are capable of being adjusted from or toward the shaft, for regulating the depth of the cut or sweep according to the surface of the ground, as the case may require. The arms f are also capable of longitudinal adjustment upon the shaft c, and held in position by set-screw h, to bring the cutters nearer to or farther from the cultivators D, according to the thickness of the cotton being cultivated. The cultivators D are adjustable laterally upon the shaft i by sliding the sleeves j k at the proper distance to or from the ends of the shaft and securing them in place by the set-screws l. The cultivators have a slight vertical movement, to accommodate them to the irregular surface of the soil or ground by forming the shank of the cultivator with recess m, and the inner face of one of the sleeves with stop m', the extent of movement being limited by the length of the recess. By changing the position of the sleeve j around the axis of the shaft, the vertical movement of the cultivator with relation to the surface of the ground may also be regulated to accommodate it to the condition of the soil.

The scrapers E, arranged in front of the choppers or cutters C, admit of the same adjustments as the cultivators D; and the adjustments obtained by the same means; the shanks of the scrapers being formed with recesses n, and one of the sleeves o p formed with stop n'. The sleeves also are capable of lateral adjustment upon the shaft q, and held in the desired position by set-screws r. Each of the shafts, near one of its ends, is formed with or has rigidly secured thereto an arm, s, slotted at its upper end to receive flat rods F, the opposite ends of the rods being secured to a pivoted hand-lever, G, said lever extending up a sufficient distance to be grasped by the driver while sitting in the seat H, when desired to raise or lower the cultivators D and scrapers E for any purpose, or to raise them out of the way of any obstructions. The distance of the point of attachment between the lever G and arms may be varied by connecting the arms s to any one of the series of holes in the outer ends of the rods F, thereby making the rods adjustable, and also their inner ends adjustable, to the required height upon the lever, which arrangement admits of any degree of change in the position of length and angle between the arms and lever to regulate the cultivators and scrapers to the varying density of the soil.

The slots or recesses in the ends of the arms s are of sufficient depth to allow the ends of the rods F to work on the pivots or pins that connect them to the arms when the lever is brought to an angle from the perpendicular.

A semicircular toothed plate, I, of metal, is secured to the frame A, with which engages a sliding spring-catch, J, for holding the lever G in any position when lowering and elevating the cultivators and scrapers, the end of the catch engaging with one of the series of teeth upon the semicircular plate I.

In the outer ends of the axle $a$ are placed suitable wheels K, formed upon their inner faces with glands L, engaging with clutches M, so that the wheels, when revolving, will carry the axle with them. Springs $t$ are secured around the ends of the axle to engage the faces of the glands with the clutches M, the tension of the springs being regulated by the screw-nuts $u$. The toothed driving-wheel B, which is fitted loosely upon the axle, is retained in place by a sliding sleeve, N. The wheel B is formed upon its toothed side with gland $v$, so that when the wheel B is required to rotate with the axle $a$, and perform its office in operating the cutters C, a sliding clutch, P, feathered upon the shaft $a$, is made to engage with the gland $v$ by a suitable lever, R, held in place by a toothed plate, S. The lever R fits in an annular recess formed around the periphery of the clutch.

Having now fully described my invention, what I claim as new, and desire to secure by Letters Patent, is—

1. In a cotton-chopper, the combination, substantially as hereinbefore described, of the cultivators D, arranged in rear of the revolving chopper, and the scrapers E, arranged in front of the chopper, the shanks of said cultivators and scrapers being provided with recesses upon their faces, to engage with stops or projections upon the faces of sleeves mounted on the shafts $i\ q$, in combination with the operating mechanism, substantially as described, whereby the cultivators and scrapers have a limited free movement and are operated simultaneously.

2. The cultivators and scrapers D E, formed with recesses upon one of the faces of their shanks, and held upon their axles between sleeves having stops upon their faces, substantially as shown, whereby the cultivators and scrapers have a limited free movement, as and for the purpose set forth.

In testimony that I claim the above I have hereunto subscribed my name in the presence of two witnesses.

ISAAC FRANKLIN BOBO.

Witnesses:
E. Y. SALMON,
E. S. N. BOBO.